(12) United States Patent
Zhang (10) Patent No.: US 12,230,096 B1
(45) Date of Patent: Feb. 18, 2025

(54) DISPLAY SCREEN AND ANTI-PEEPING METHOD THEREOF, AND ELECTRONIC GAME TABLE

(71) Applicant: Beitefulai Technology Co., Ltd, Shenzhen (CN)

(72) Inventor: Xiaodong Zhang, Shenzhen (CN)

(73) Assignee: Beitefulai Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/784,968

(22) Filed: Jul. 26, 2024

Related U.S. Application Data (62) Division of application No. 18/610,240, filed on Mar. 19, 2024.

(30) Foreign Application Priority Data

Jan. 2, 2024 (CN) .......................... 202410007293.X
Jan. 2, 2024 (CN) .......................... 202410014448.2

(51) Int. Cl.
*G07F 17/32* (2006.01)
*G06F 3/14* (2006.01)

(52) U.S. Cl.
CPC .............. *G07F 17/322* (2013.01); *G06F 3/14* (2013.01)

(58) Field of Classification Search
CPC .................................. G07F 17/322; G06F 3/14
See application file for complete search history.

(56) References Cited

U.S. PATENT DOCUMENTS

2023/0112066 A1* 4/2023 Danielson ........... G07F 17/3211
463/11

* cited by examiner

*Primary Examiner* — Deeprose Subedi
(74) *Attorney, Agent, or Firm* — Bayramoglu Law Offices LLC (57) ABSTRACT

A anti-peeping method of a display screen includes a display process and a hiding process: removing a cover; recognizing, by an optical sensor, a brightness change from dark to bright, and transmitting a signal to a display screen; displaying, by the display screen, a virtual card; returning the cover; recognizing, by the optical sensor, a brightness from bright to dark, and transmitting a signal to the display screen; and canceling, by the display screen, the display of the virtual card. The anti-peeping method eliminates the risk of being peeped at. The electronic game table includes a table body, a public screen, player screens, and a signal processing module. A user clicks on the public screen to trig a dealing instruction, and the signal processing module is configured to receive the dealing instruction, randomly send card data to a plurality of player screens, and display patterns on the display screens.

2 Claims, 11 Drawing Sheets

DISPLAY SCREEN AND ANTI-PEEPING METHOD THEREOF, AND ELECTRONIC GAME TABLE

CROSS REFERENCE TO THE RELATED APPLICATIONS

This application is a divisional application of U.S. patent application Ser. No. 18/610,240, filed on Mar. 19, 2024, which is based upon and claims priority to Chinese Patent Applications No. 202410007293.X and No. 202410014448.2, both filed on Jan. 2, 2024, the entire contents of which are incorporated herein by reference.

TECHNICAL FIELD

The present disclosure relates to the technical field of electronic game tables, and specifically to an electronic game table, a display screen and an anti-peeping method thereof.

BACKGROUND

Traditional mechanical chess and card game tables require specialized game props such as cards. However, game props are easily recognizable after being worn out, which affects game fairness, and the process of shuffling and re-dealing cards takes a lot of time. In order to solve these problems, electronic game tables using virtual cards have emerged on the market. The electronic game table is provided with a touch screen that displays virtual cards, and users can control the game progress by touching the screen. Specifically, the electronic game table is applicable to Mahjong, Chinese Pokers, Texas Hold'em Poker, and Legends of the Three Kingdoms.

Due to the fact that virtual cards displayed on the display screen cannot be flipped like physical cards for anti-peeping purposes, anti-peeping display screens are particularly important for electronic game tables. Generally, in the existing anti-peeping methods of display screens, a covering object blocking the view is placed next to the display screen, but this approach still carries the risk of being peeped at. Further, there is an anti-peeping film attached to the display screen. Although the anti-peeping film based on optical principles can make the display screen darken when viewed from other perspectives, a blurry outline of the virtual card can still be seen.

SUMMARY

The present disclosure provides an electronic game table, a display screen and an anti-peeping method thereof, solving the problem of existing game display screens such as poor anti-peeping effect and inability to provide a real gaming experience.

To solve the above technical problem, the present disclosure adopts the following technical solutions.

A first aspect of the present disclosure provides an anti-peeping method of a display screen, including a display process and a hiding process, where
the display process includes:
  removing a cover from a display screen and an optical sensor; and recognizing, by the optical sensor, a first brightness change, and outputting a first signal, where the first brightness change is a brightness change from dark to bright; and
  displaying, by the display screen, a virtual card based on the first signal; and
the hiding process includes:
  completely covering, by the cover, the optical sensor; and recognizing, by the optical sensor, a second brightness change, and outputting a second signal, where the second brightness change is a brightness change from bright to dark; and
  canceling, by the display screen, the display of the virtual card based on the second signal.

A second aspect of the present disclosure provides a display screen, including a display panel and an optical sensor, where the display panel is configured to display game information; the optical sensor is provided on the display panel and configured to recognize a brightness change in a surrounding environment; and the display screen is configured to perform:
  removing a cover from the display panel and the optical sensor; and recognizing, by the optical sensor, a first brightness change, and outputting a first signal, where the first brightness change is a brightness change from dark to bright;
  displaying, by the display screen, a virtual card based on the first signal;
  completely covering, by the cover, the optical sensor; and recognizing, by the optical sensor, a second brightness change, and outputting a second signal, where the second brightness change is a brightness change from bright to dark; and
  canceling, by the display screen, the display of the virtual card based on the second signal.

A third aspect of the present disclosure provides an electronic game table, including a table body, a cover, and the above-mentioned display screen, where the display screen and the cover are provided on the table body; and the cover is configured to cover the display screen.

A fourth aspect of the present disclosure provides an electronic game table, including:
  a table body, provided with a game table top;
  a public screen, provided on the table body and exposed on a side of the game table top;
  a plurality of display screens, exposed on the side of the game table top; and
  a signal processing module, including a dealing module and a processing module, where the dealing module is configured to receive a click operation of a user on the public screen to trig a dealing instruction; and the processing module is configured to receive the dealing instruction, randomly send card data to the plurality of display screens, and display patterns on the display screens.

According to the above technical solutions, embodiments of the present disclosure have at least the following advantages and positive effects.

In the embodiments of the present disclosure, a physical cover is configured to cover the display screen, such that the virtual cards on the display screen cannot be seen from all perspectives. After the cover covers the display screen, the virtual cards on the display screen are hidden, and other users cannot peek at the virtual cards through peeping methods. In the process of displaying virtual cards such as showing down, users move the covers to display the virtual cards. The present disclosure has simple and convenient operation, and can provide a good and realistic gaming experience.

The electronic game table includes a table body, a public screen, player screens, and a signal processing module. A user can click on the public screen to trigger a dealing instruction. The signal processing module receives the dealing instruction, randomly sends card data to a plurality of player screens, and displays patterns on the display screens. Through the combination of the public screen and the display screens, the electronic game table can make the game close to real ones, thereby providing a real gaming experience.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show some embodiments of the present disclosure, and those of ordinary skill in the art may still derive other drawings from these drawings without creative efforts.

REFERENCE NUMERALS 1. electronic game table; and
11. table body; 111. game table top; 112. table top board; 113. table leg; 12. public screen; 13. display screen; 131. display panel; 132. touch board; 133. display board; 134. optical sensor; 134a. first optical sensor; 134b. second optical sensor; 14. signal processing module; 141. screening module; 142. dealing module; 143. processing module; 144. game determination module; 145. game medium acceptance module; 15. storage area; 16. cover; and 17. mounting strip.

DETAILED DESCRIPTION OF THE EMBODIMENTS

The typical implementations embodying the features and advantages of the present disclosure are described in detail below. It should be understood that the present disclosure may have various changes in different implementations, which do not depart from the scope of the present disclosure.

The description and drawings herein are essentially used for the purpose of explanation, rather than to limit the present disclosure.

In addition, the terms "first" and "second" are merely intended for a purpose of description, and shall not be understood as an indication or implication of relative importance or implicit indication of a quantity of indicated technical features. Therefore, the features defined by "first" and "second" can explicitly or implicitly include one or more features. In the description of the present application, "a plurality of" means two or more, unless otherwise specifically defined.

In the description of the present disclosure, it should be noted that, unless otherwise clearly specified, meanings of terms "mount", "connect with", and "connect to" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand the specific meanings of the above terms in the present disclosure based on specific situations.

Referring to FIGS. 1 to 5, the present disclosure provides electronic game table 1. The electronic game table 1 is provided for multiple users to play games simultaneously. The electronic game table 1 includes table body 11, public screen 12, display screens 13, and signal processing module 14. The signal processing module 14 is located inside the table body 11.

Figure 1:
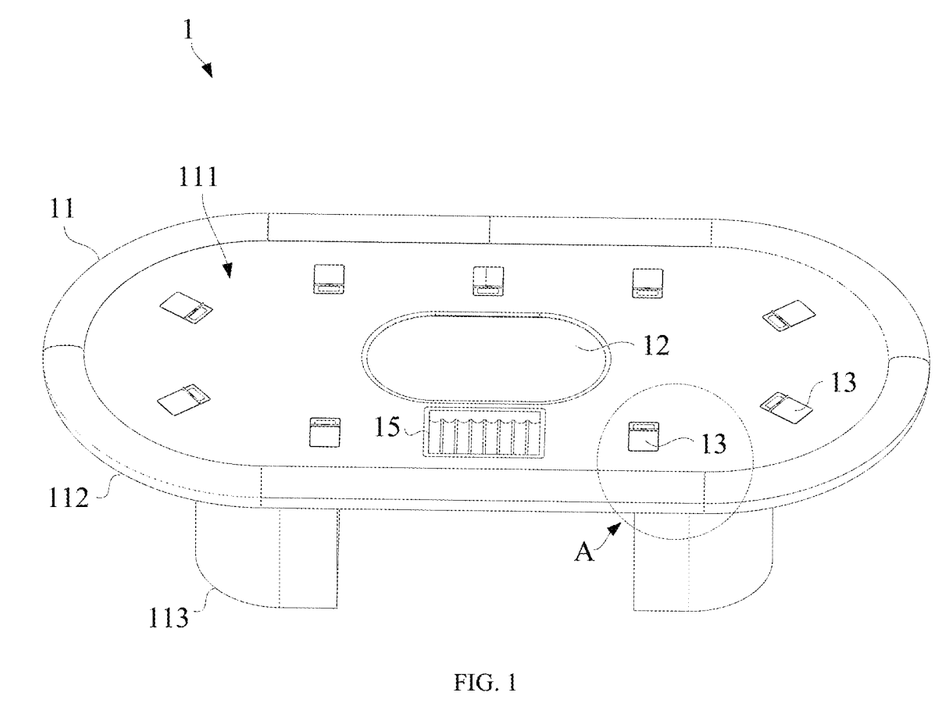
FIG. 1 is a structural diagram of an electronic game table according to an embodiment of the present disclosure.
Figure 2:
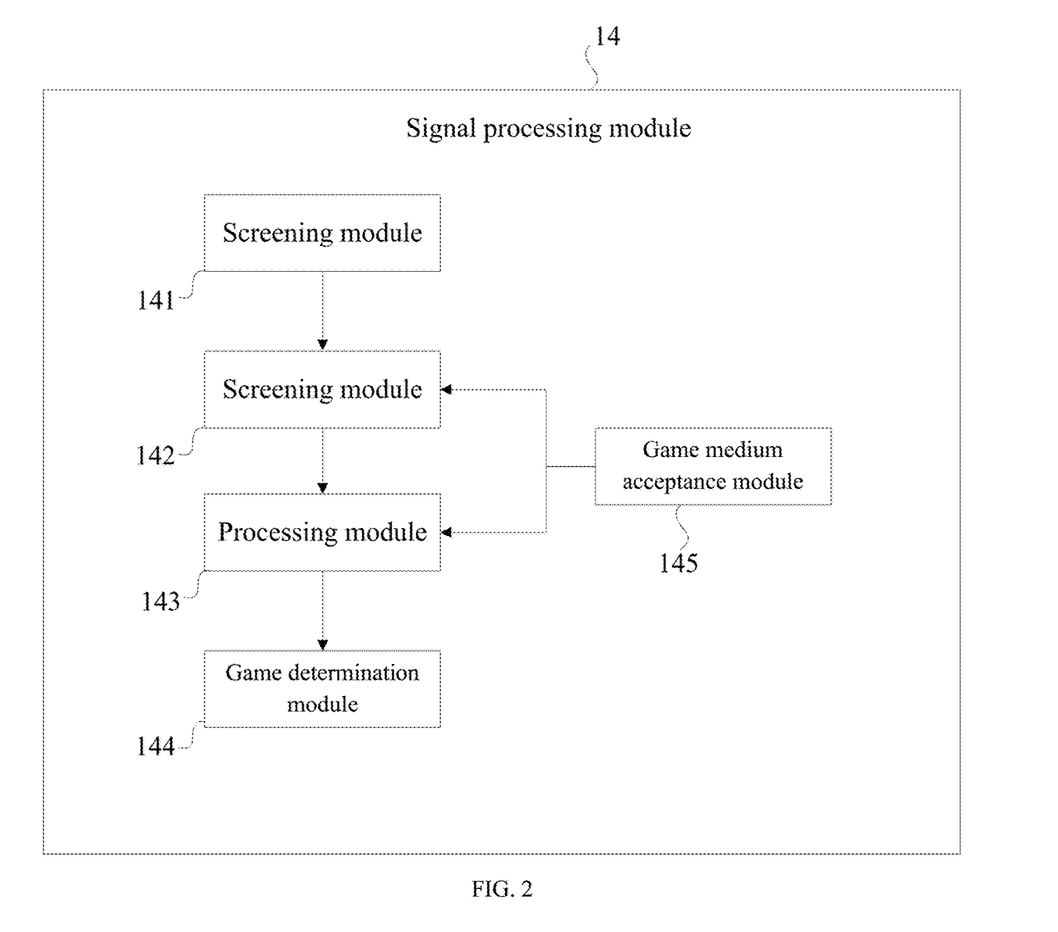
FIG. 2 is a schematic diagram of a signal processing module of the electronic game table shown in FIG. 1.
Figure 3A:
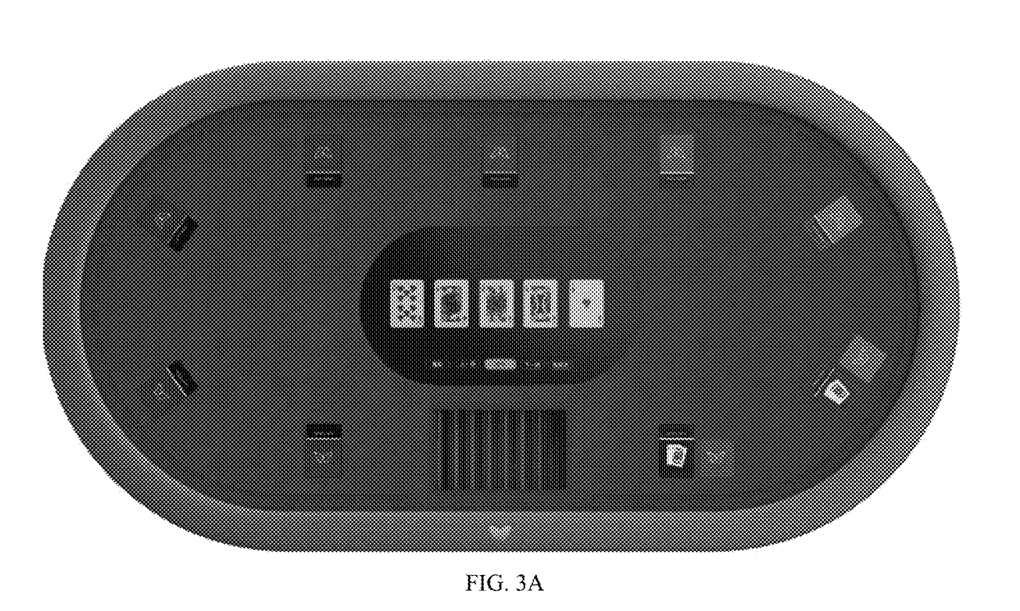
FIGS. 3A-3B are schematic diagrams of a game table top and a display screen of the electronic game table shown in FIG. 1.
Figure 3B:
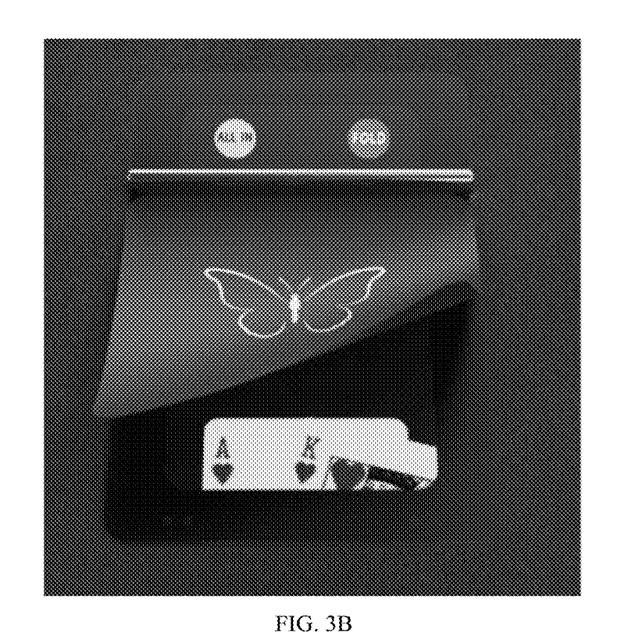

Specifically, the table body 11 is provided with game table top 111. The public screen 12 is provided on the table body 11 and exposed on a side of the game table top 111. There are a plurality of display screens 13. The plurality of display screens 13 are exposed on the side of the game table top 111. As shown in FIG. 2, the signal processing module 14 includes dealing module 142 and processing module 143. The dealing module 142 is configured to receive a click operation of a user on the public screen to trig a dealing instruction 12. The processing module 143 is configured to receive the dealing instruction, randomly send card data to the plurality of display screens 13, and display patterns on the display screens 13.

In Texas Hold'em Poker games, a process of dealing cards is as follows. A user clicks on the public screen 12 such that the dealing module 142 triggers the dealing instruction. The processing module 143 receives the dealing instruction, randomly sends card data to the display screen 13 that participates in the game, and displays virtual cards on the corresponding display screen 13. Of course, the electronic game table 1 can also be applied to games such as Mahjong and Chinese Pokers. The specific gameplay can refer to any existing game, and will not be elaborated herein.

Compared to traditional game tables, in the present application, the electronic game table 1 displays virtual card patterns and does not require physical cards. One electronic game table 1 integrates a plurality of games, making it easy to use. Meanwhile, the electronic game table 1 can automatically deal and shuffle cards, reducing waiting time of users. Furthermore, the method of clicking on the public screen 12 to deal cards to the plurality of display screens 13 is close to real games and enhances the user experience.

The signal processing module 14 further includes screening module 141. The screening module 141 is configured to receive a game participation instruction triggered by the click operation of the user on the display screen 13 and send information of the display screen 13 to the processing module. Before playing the game, a click operation of a directors on the public screen 12 to send confirmation instructions to the plurality of display screens 13. The plurality of display screens 13 display pending information. The user clicks on the display screen 13 to send a confirmation instruction to the screening module 141. The screening module 141 determines the display screen 13 and the corresponding user to join the game based on the received confirmation instruction, and sends the corresponding information to the processing module.

In another embodiment, the screening module 141 is configured to receive information of a display screen 13 and a user participating in a game, input by a click operation of a director on the public screen 12, and send the corresponding information to the processing module. Specifically, the director determines the user participating in the game through verbal communication or other means, and clicks on the public screen 12 to input a number of the display screen 13 participating in the game and the corresponding user to the screening module 141. The screening module 141 sends the information of the corresponding display screen 13 to the processing module 143. The screening module 141 can quickly confirm the user participating in the game, thereby advancing the game progress.

The signal processing module 14 further includes game determination module 144. The game determination module 144 is configured to determine a game result based on patterns displayed on the plurality of display screens 13 and a preset game rule, and display the game result on the public screen 12.

The processing module 143 is further configured to receive the dealing instruction, send card data to the public screen 12, and display patterns on the public screen 12. In Texas Hold'em Poker games, the user needs to combine or compare his/her cards with community cards. Therefore, the processing module 143 needs to send card data to the display screens 13 and display cards on the display screens. In addition, the processing module 143 needs to send community cards to the public screen 12, display cards on the public screen, and combine the cards displayed on the display screen 13 and the community cards displayed on the public screen 12 to obtain a game result. In this way, the electronic game table 1 can provide a realistic gaming experience.

Furthermore, the processing module 143 is configured to randomly send card data to the public screen 12 for multiple times and display patterns on the public screen 12. After each pattern display, the number of the patterns displayed on the public screen 12 increases. Correspondingly, the game determination module 144 is configured to determine a game result based on the patterns displayed on the public screen 12, patterns displayed on the plurality of display screens 13, and the preset game rule, and display the game result on the public screen 12.

The following is an example of a plurality of deals of the processing module 143 and the corresponding game determination module 144 based on a Texas Hold'em Poker game. The Texas Hold'em Poker game can be simply divided into five steps.

Step 1: Hole cards.

The director clicks on the public screen 12 to trigger a first dealing instruction of the dealing module 142. The processing module 143 receives the first dealing instruction, randomly sends card data to the plurality of display screens 13, and displays cards on the display screens 13. Each display screen 13 participating in the game displays two cards as hole cards.

Step 2: Flop.

The director clicks on the public screen 12 to trigger a second dealing instruction of the dealing module 142. The processing module 143 receives the second dealing instruction, randomly sends card data to the public screen 12, and displays three cards as community cards on the public screen 12.

Step 3: Turn.

The director continues to click on the public screen 12 to trigger a third dealing instruction of the dealing module 142. The processing module 143 receives the third dealing instruction, randomly sends card data to the public screen 12, and displays another card on the public screen 12, such that the public screen 12 displays a total of four cards as community cards.

Step 4: River.

The director clicks on the public screen 12 to trigger a fourth dealing instruction of the dealing module 142. The processing module 143 receives the fourth dealing instruction, randomly sends card data to the public screen 12, and displays another card on the public screen 12, such that the public screen 12 displays a total of five cards as community cards.

Step 5: Construct.

Users made a combination out of the two hole cards on the corresponding display screen 13 and the five community cards on the public screen 12, and one with the best combination is the winner. The specific rule for construction can refer to any existing game rule of Texas Hold'em Poker.

It should be noted that before Step 1: Hole cards, there may be another step for screening users by the screening module 141 to determine the specific users participating in the game.

Furthermore, the signal processing module 14 includes game medium acceptance module 145. The game medium acceptance module 145 is configured to receive a game medium input by a click operation of the user on the display screen 13. After the game ends, the ownership of the game medium is related to the game result. For example, in the Texas Hold'em Poker game, the game medium is game points. Before the game result is output, users participating in the game can click on the display screen 13 to invest a certain amount of game points. After the game result is output, all game points invested by players belong to the winner. Of course, the game medium can be any tangible or intangible item.

Referring to FIG. 1, the game table top 111 of the electronic game table 1 is provided with storage area 15. The storage area 15 is configured to store a physical game medium. The storage area 15 facilitates the storage and count of the physical game medium. Of course, if necessary, the storage area 15 may be located at other positions or may not be provided.

Furthermore, the table body 11 includes table top board 112 and table legs 113. The table legs 113 are detachably connected to the table top board 112 for convenient storage. The materials of the table top board 112 and the table legs 113 are not limited. The table legs 113 are detachably connected, such that the electronic game table 1 can use different lengths of table legs 113 to form game table tops 111 of different heights.

Figure 6:
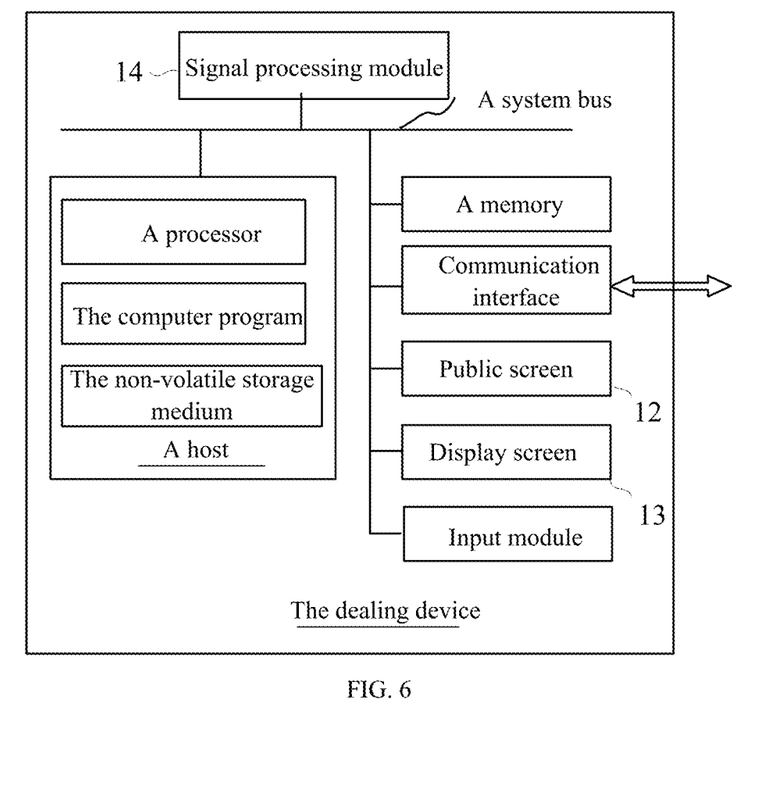
FIG. 6 is an internal structural diagram of a dealing device of the electronic game table shown in FIG. 1.

FIG. 6 is an internal structural diagram of a dealing device including the signal processing module 14. As shown in FIG. 6, the dealing device can be located inside or outside the table body 11.

The dealing device includes a host connected through a system bus, the signal processing module 14, a memory, a communication interface, the public screen 12, the display screens 13, and an input module. A processor in the host is configured to provide computing and control capabilities. The memory includes a non-volatile storage medium and an internal memory. The non-volatile storage medium is configured to store an operating system and a computer program, while the internal memory provides an environment for the operation of the operating system and the computer program in the non-volatile storage medium. The communication interface is configured for wired or wireless communication with an external terminal. Wireless communication can be achieved through wireless fidelity (WiFi), service provider networks, near-field communication (NFC) or other means. The input module can be a touch component such as a button, a trackball or a touch board on the table body 11. The touch component can be fixedly provided on the game table top 111 or be an active component that is movable freely on the game table top 111 or at other positions.

Any reference to a memory, a storage, a database, or other media used in the present application may include at least one of non-volatile and volatile memories. The nonvolatile memory may include a read-only memory (ROM), a magnetic tape, a floppy disk, a flash memory, or an optical memory. The volatile memory may include a random access memory (RAM) or an external cache memory. As an illustration rather than a limitation, the RAM may be in various forms, such as a static random access memory (SRAM) or a dynamic random access memory (DRAM).

Figure 4:
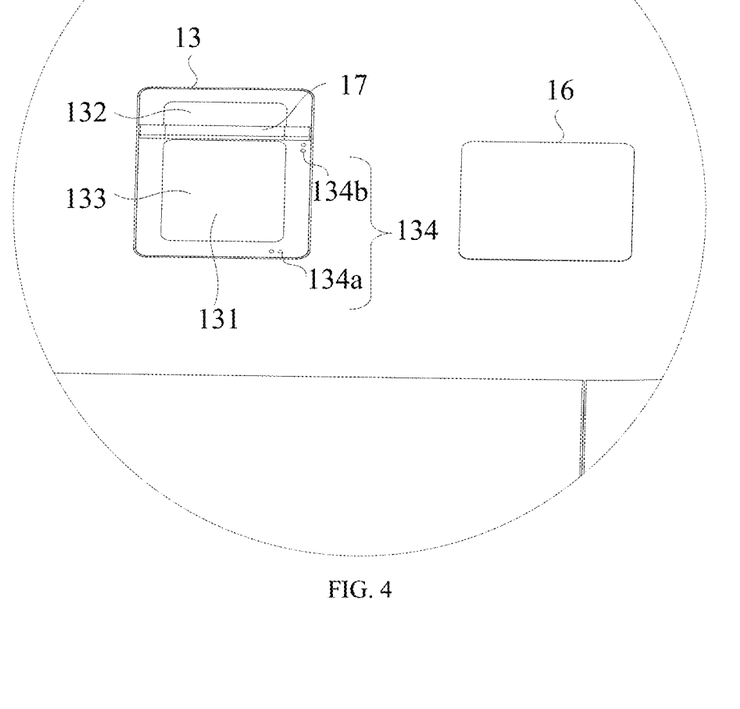
FIG. 4 is an enlarged view of A of the electronic game table shown in FIG. 1.
Figure 7:
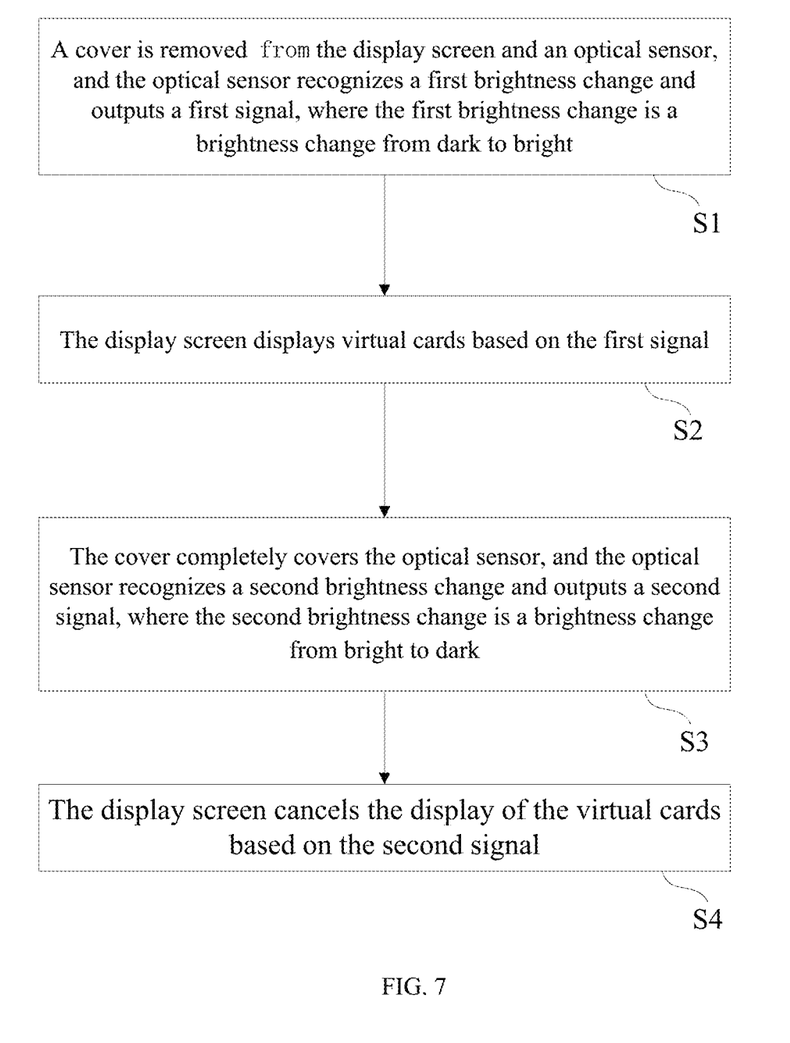
FIG. 7 is a flowchart of an anti-peeping method of a display screen according to an embodiment of the present disclosure.

Referring to FIGS. 4 and 7, the present application provides an anti-peeping method of a display screen. This anti-peeping method can be applied to the display screen 13 and a game device with the display screen 13, and includes a display process and a hiding process.

The display process includes the following steps.
- S1. A cover is removed from the display screen and an optical sensor, and the optical sensor recognizes a first brightness change and outputs a first signal, where the first brightness change is a brightness change from dark to bright.
- S2. The display screen displays virtual cards based on the first signal.

The hiding process includes the following steps.
- S3. The cover completely covers the optical sensor, and the optical sensor recognizes a second brightness change and outputs a second signal, where the second brightness change is a brightness change from bright to dark.
- S4. The display screen cancels the display of the virtual cards based on the second signal.

In the present application, the optical sensor 134 is a sensor that converts an optical signal into an electrical signal and outputs the electrical signal. The specific type and model of the sensor are not limited, and any existing optical sensor on the market can be used.

When the optical sensor 134 recognizes the first brightness change, the optical sensor 134 is triggered to output the first signal to the display screen 13, and the display screen 13 determines that the cover is removed by the user and displays a virtual card. When the optical sensor 134 recognizes the second brightness change, the optical sensor 134 is triggered to output the second signal to the display screen 13, and the display screen 13 determines that the cover is removed by the user and hides the virtual card to prevent the virtual card from being seen.

In an embodiment, regarding the first brightness change, brightness recognized by the optical sensor 134 increases from a value less than a first preset threshold to a value greater than or equal to the first preset threshold. Regarding the second brightness change, the brightness recognized by the optical sensor 134 decreases from a value greater than or equal to a second preset threshold to a value less than the second preset threshold. It should be explained that in actual usage environments, changes in the brightness of lighting and outdoor light may interfere with the recognition by the optical sensor 134. The optical sensor 134 outputs the first signal or the second signal to display or hide the virtual card on the display screen 13 when it recognizes a brightness change around the display screen 13. At this point, if the user does not remove or return the cover, an unwanted effect may occur. Therefore, in the present application, the interference of lighting and other factors can be avoided through the first preset threshold and the second preset threshold, thereby improving the user experience. The first preset threshold and the second preset threshold are not fixed values, and manufacturers can set different first preset thresholds and different second preset thresholds based on the specific usage scenario of the display screen 13.

In traditional anti-peeping methods of display screens, a covering member is located around the display screen 13 to block the view of other users. But the covering member can only block partial angles of peeking, and there is still a risk of virtual cards on the display screen 13 being peeked at. Moreover, the covering member separates users from each other, making it impossible to provide a real gaming experience. In the present application, a physical cover is configured to cover the display screen 13. After the cover covers the display screen 13, the display screen 13 hides the virtual card, and other users cannot peek at the user's virtual card through electronic devices or other means. In the process of displaying virtual cards such as showing down, users only need to gently lift the cover to display the virtual cards. The design is simple and convenient for operation, and can provide a good and real gaming experience.

Figure 5:
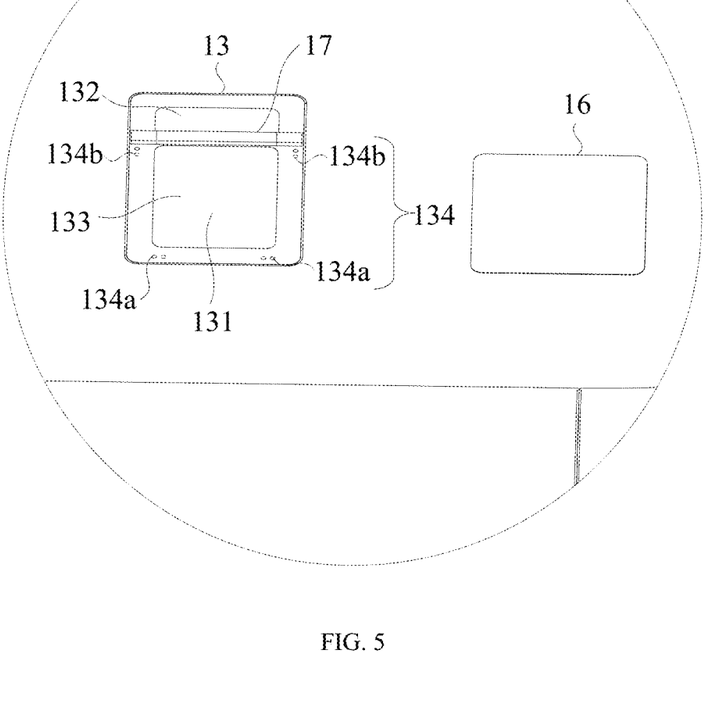
FIG. 5 is an enlarged view of A of the electronic game table shown in FIG. 1 according to another embodiment.

Referring to FIG. 5, in an embodiment, the optical sensor 134 includes first optical sensor 134a and second optical sensor 134b. In step S1, the cover is removed from the display screen and the optical sensor, and the optical sensor recognizes a first brightness change and outputs a first signal, where the first brightness change is a brightness change from dark to bright. Correspondingly, in this step, there are four cases as follows.

Figure 8:
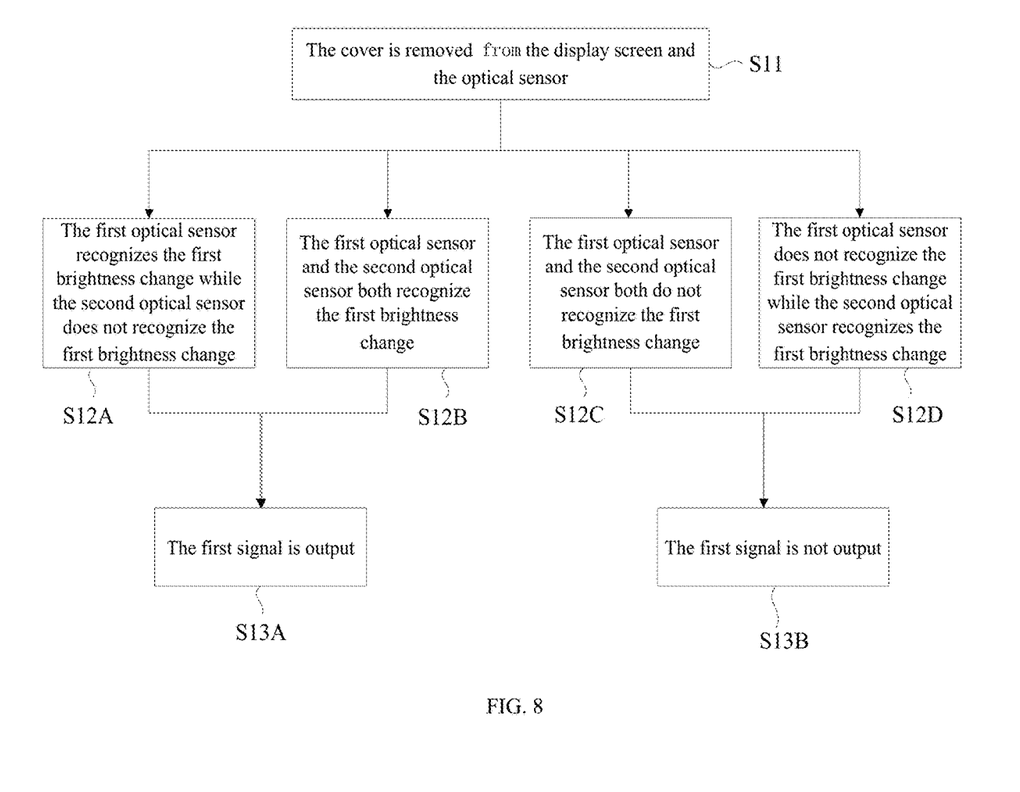
FIG. 8 is a flowchart of step S1 of the anti-peeping method shown in FIG. 7.

A first case includes the following steps.
- S11. The cover is removed from the display screen and the optical sensor.
- S12A. The first optical sensor recognizes the first brightness change while the second optical sensor does not recognize the first brightness change.
- S13A. The first signal is output.

A second case includes the following steps.
- S11. The cover is removed from the display screen and the optical sensor.
- S12B. The first optical sensor and the second optical sensor both recognize the first brightness change.
- S13A. The first signal is output.

A third case includes the following steps.
- S11. The cover is removed from the display screen and the optical sensor.
- S12C. The first optical sensor and the second optical sensor both do not recognize the first brightness change.
- S13B. The first signal is not output.

A fourth case includes the following steps.

S11. The cover is removed from the display screen and the optical sensor.

S12D. The first optical sensor does not recognize the first brightness change while the second optical sensor recognizes the first brightness change.

S13B. The first signal is not output.

It should be noted that in the present application, the description of the position of the display screen is based on the relative position between the user and the display screen. When the user is facing the display screen, the position of the display screen observed from the user's perspective is described as "upper", "lower", "left", "right", "top", and "bottom".

Referring to FIG. 4, the present application further provides display screen 13. FIG. 4 is a structural diagram of the display screen 13 and cover 16. The display screen 13 includes display panel 131 and optical sensor 134. The display panel 131 is configured to display game information, and the optical sensor 134 is provided on the display panel 131. The optical sensor 134 is configured to recognize a brightness change in a surrounding environment, convert the brightness change into an electrical signal, and transmit the electrical signal to the display panel 131. The display screen 13 adopts the anti-peeping method shown in FIG. 6.

Specifically, the optical sensor 134 includes first optical sensor 134a and second optical sensor 134b. The first optical sensor 134a is located at a bottom of the display panel 131, and the second optical sensor 134b is located at a top of the display panel 131. The first optical sensor 134a and the second optical sensor 134b are configured to recognize the brightness change in the surrounding environment.

Figure 9A:
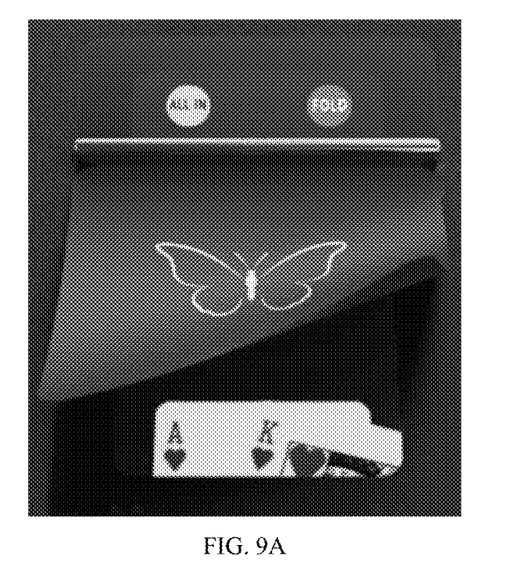
FIGS. 9A-9B are schematic diagrams of the display screen shown in FIGS. 3A-3B and a cover.

FIG. 4 is a schematic diagram of the display screen 13 and the cover 16. FIG. 9A is a schematic diagram showing that the cover 16 is partially removed from the display screen 13, and FIG. 9B is a schematic diagram showing that the cover 16 is completely removed from the display screen 13.

Referring to FIGS. 8 and 9A, in the first case, the user views their virtual card. To prevent the user from being peeped at by other users, the user can remove a portion of the cover 16 from bottom to top. The first optical sensor 134a at the bottom of the display panel 131 recognizes a brightness change from dark to bright, while the second optical sensor 134b does not recognize the brightness change from dark to bright. A first signal is output, and the display panel 131 displays virtual cards based on the first signal. In the fourth case, if the user accidentally touches and causes a portion of the cover 16 to be removed from top to bottom, the first optical sensor 134a at the bottom of the display panel 131 does not recognize the brightness change from dark to bright, and the second optical sensor 134b recognizes the brightness change from dark to bright. The first signal is not output, and the display panel 131 does not display virtual cards. At this point, the user does not want to remove some portion of the cover 16. If a top of the cover 16 is removed, the virtual card will be displayed, posing a risk of the virtual card being peeked at by other users.

Figure 9B:
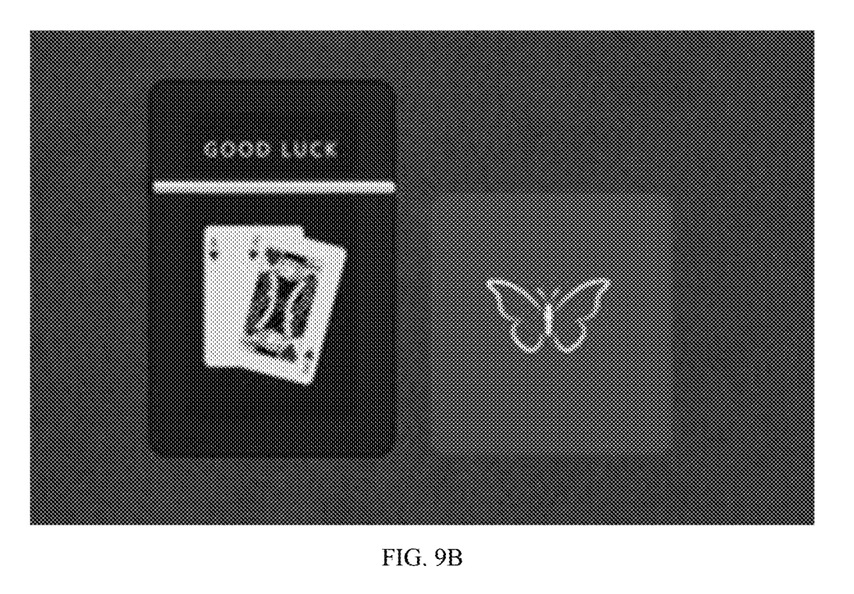

Referring to FIGS. 8 and 9B, in the second case, the user needs to display all the virtual cards in game stages such as showdowns. The user can remove the cover 16 completely from display screen 13. The first optical sensor 134a at the bottom of the display panel 131 and the second optical sensor 134b at the top of the display panel 131 both recognize the brightness change from dark to bright. The first signal is output, and the display panel 131 shows the virtual card. In the third case, if the user does not need to display the virtual card, the user can keep the cover 16 completely covering the display panel 131. The first optical sensor 134a at the bottom of the display panel 131 and the second optical sensor 134b at the top of the display panel 131 do not recognize the brightness change from dark to bright, and the display panel 131 does not display the virtual card. Of course, the number and position of the optical sensor 134 can be set as needed, and are not limited in the present application.

Figure 10:
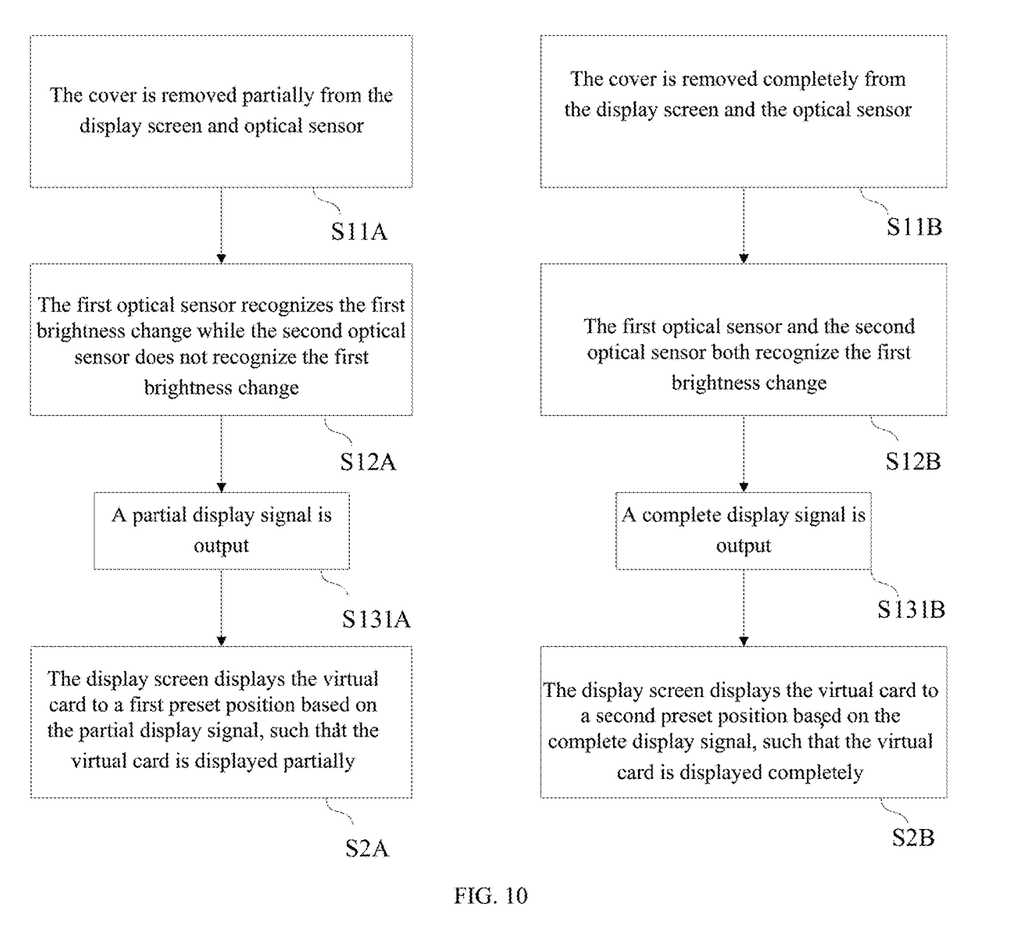
FIG. 10 is a flowchart of a display process according to the present disclosure.

Referring to FIGS. 9A-9B and 10, FIG. 10 illustrates the display process of the anti-peeping method. In an embodiment, the display process includes a partial display mode and a complete display mode, and the first signal includes a partial display signal and a complete display signal.

The partial display mode includes the following steps.

S11A. The cover is removed partially from the display screen and optical sensor.

S12A. The first optical sensor recognizes the first brightness change while the second optical sensor does not recognize the first brightness change.

S131A. A partial display signal is output.

S2A. The display screen displays the virtual card to a first preset position based on the partial display signal, such that the virtual card is displayed partially.

The complete display mode includes the following steps.

S11B. The cover is removed completely from the display screen and the optical sensor.

S12B. The first optical sensor and the second optical sensor both recognize the first brightness change.

S131B. A complete display signal is output.

S2B. The display screen displays the virtual card to a second preset position based on the complete display signal, such that the virtual card is displayed completely.

Referring to FIG. 9A, in a Texas Hold'em Poker game, the display screen 13 of the user displays two virtual cards as hole cards. When the user wants to view the hole cards, the user can remove the cover 16 partially. After receiving the partial display signal, the display screen 13 displays the virtual cards to the first preset position. A corner of each of the virtual cards is displayed, and the user can see the ranks and suits of the virtual cards. Displaying only one corner of the card reduces the risk of the card being peeked at and provides a realistic gaming experience for the user. Referring to FIG. 9B, when the user needs to show down, all the virtual cards need to be displayed. The user removes the cover 16 completely, and the display screen 13 receives a complete display signal and displays the virtual cards to a second preset position. The virtual cards are displayed completely, and the director can quickly see the ranks and suits of the virtual cards. Of course, the manufacturer can also set different first preset positions and second preset positions as needed.

Referring to FIG. 4, mounting strip 17 is attached to a surface of the display panel 131. The mounting strip 17 divides the display panel 131 into touch board 132 and display board 133. The first optical sensor 134a is located at a bottom of the display board 133, and the second optical sensor 134b is located at a top of the display board 133. The touch board 132 is configured to perform a manual control to advance the game progress. The display board 133 is configured to display game information, and the top of the cover 16 can be mounted on the mounting strip 17 and cover the display board 133.

Specifically, a surface of a side of the mounting strip 17 exposed on the display panel 131 is provided with a mounting groove. An end of the cover 16 enters the mounting groove through an opening of the mounting groove and is clamped in the mounting groove by a wall of the mounting groove. The cover 16 can be removed from the mounting groove. When the cover 16 is damaged, it can be quickly replaced. In addition, the mounting strip 17 can also fix the cover 16 through magnetic suction, threaded connection, and other methods.

Figure 11:
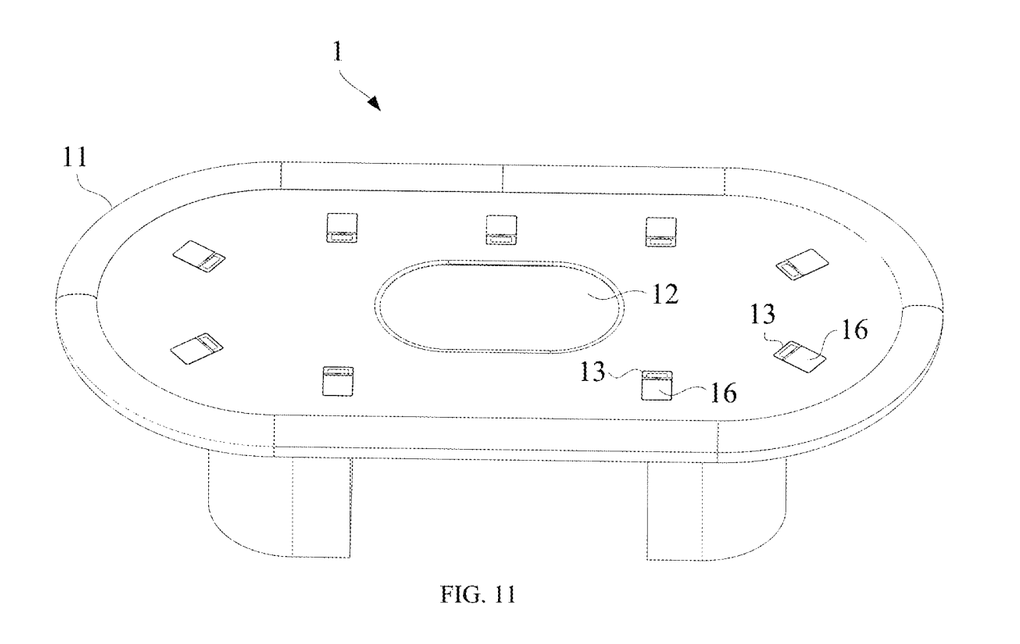
FIG. 11 is a structural diagram of an electronic game table according to another embodiment of the present disclosure.

Referring to FIG. 11, the present disclosure further provides electronic game table 1. The electronic game table 1 includes display screens 13 using the anti-peeping method, covers 16, and table body 11. The display screens 13 and the covers 16 are provided on the table body 11, and the covers 16 are configured to cover the display screens 13.

The electronic game table 1 further includes public screen 12 provided on the table body 11. The public screen 12 and the display screen 13 are signal-connected and are configured to transmit information to each other. The public screen 12 is configured to display game information and a game progress. Taking a Texas Hold'em Poker game as an example, the public screen 12 and the display screens 13 are introduced to the game. The public screen 12 is configured to display community cards, and each display screen 13 displays hole cards of a user. A game result is determined based on the community cards displayed on the public screen 12 and the hole cards displayed on the display screen 13.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs. Therefore, all changes and modifications falling within the claims or the equivalent scope thereof should be covered by the appended claims.

What is claimed is:

1. An anti-peeping method of a display screen, comprising a display process and a hiding process, wherein
the display process comprises:
removing a cover from the display screen and an optical sensor; and recognizing, by the optical sensor, a first brightness change, and outputting a first signal, wherein the first brightness change is from dark to bright; and
displaying, by the display screen, a virtual card based on the first signal; and
the hiding process comprises:
completely covering, by the cover, the optical sensor; and recognizing, by the optical sensor, a second brightness change, and outputting a second signal, wherein the second brightness change is from bright to dark; and
canceling, by the display screen, a display of the virtual card based on the second signal;
wherein the optical sensor comprises a first optical sensor and a second optical sensor; and
the step of removing the cover from the display screen and the optical sensor comprises:
outputting the first signal when the first optical sensor recognizes the first brightness change while the second optical sensor does not recognize the first brightness change;
not outputting the first signal when the first optical sensor does not recognize the first brightness change while the second optical sensor recognizes the first brightness change;
outputting the first signal when the first optical sensor and the second optical sensor both recognize the first brightness change; and
not outputting the first signal when the first optical sensor and the second optical sensor both do not recognize the first brightness change;
wherein the first signal comprises a partial display signal and a complete display signal; and
the step of removing the cover from the display screen and the optical sensor comprises:
outputting the partial display signal when the first optical sensor recognizes the first brightness change while the second optical sensor does not recognize the first brightness change;
and displaying, by the display screen, the virtual card to a first preset position based on the partial display signal, such that the virtual card is displayed partially; and
outputting the complete display signal when the first optical sensor and the second optical sensor both recognize the first brightness change; and displaying, by the display screen, the virtual card to a second preset position based on the complete display signal, such that the virtual card is displayed completely.

2. The anti-peeping method according to claim 1, wherein regarding the first brightness change, a brightness recognized by the optical sensor increases from a value less than a first preset threshold to a value greater than or equal to the first preset threshold; and regarding the second brightness change, the brightness recognized by the optical sensor decreases from a value greater than or equal to a second preset threshold to a value less than the second preset threshold.

* * * * *